Nov. 28, 1961   J. T. DICKINSON   3,010,243
CONVERTIBLE FISH LURE

Filed Aug. 17, 1959   2 Sheets-Sheet 1

JOHN T. DICKINSON
*INVENTOR.*

BY
*Smith & Tuck*

Nov. 28, 1961    J. T. DICKINSON    3,010,243
CONVERTIBLE FISH LURE
Filed Aug. 17, 1959    2 Sheets-Sheet 2
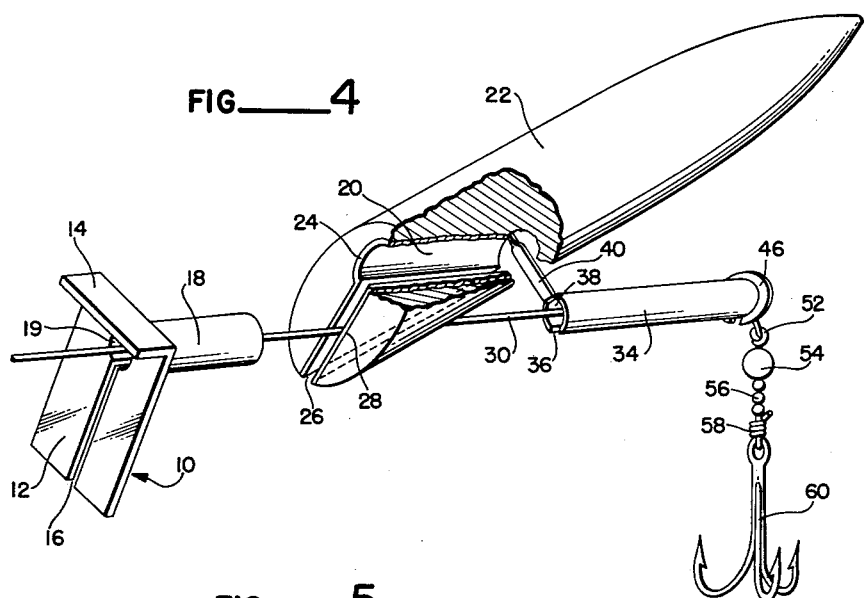
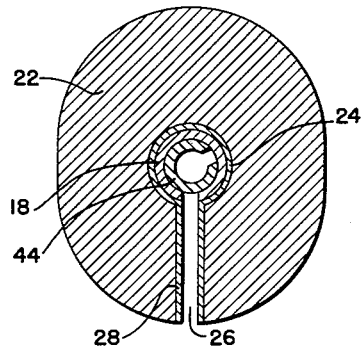
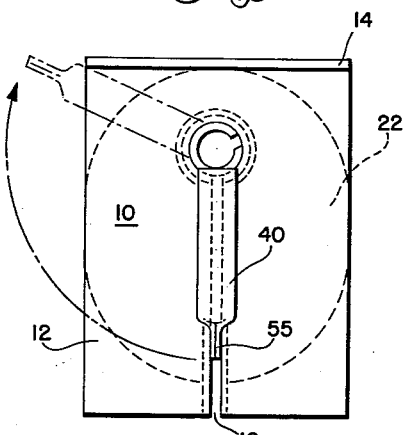
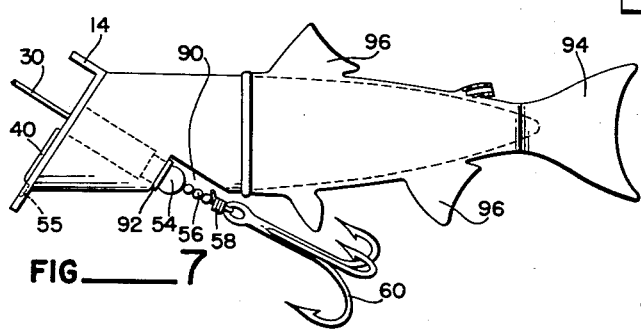
JOHN T. DICKINSON
*INVENTOR.*
BY *Smith & Tuck*

United States Patent Office 3,010,243
Patented Nov. 28, 1961

3,010,243
CONVERTIBLE FISH LURE
John T. Dickinson, 104 Wall St., Seattle, Wash.
Filed Aug. 17, 1959, Ser. No. 834,149
4 Claims. (Cl. 43—42.09)

This present invention relates to a convertible fish lure and more particularly to the type employing two main elements, the body of the lure and the hook means, including a fish hook and leader which passes through the lure to the front of the same for attachment to the fishing line.

In fishing with plugs and artificial lures, simulated insects or other animal or fish life it is very desirable to be able to supply a lure which has the characteristics, especially in color and size, of the natural food available to the fish in that locality. Experience has also shown that the type of hook means many times has a marked effect upon the effectiveness of a lure for fish of a certain type or size.

In the past many attempts have been made to provide demountable or changeable fishing lures but so often the realistic appearance and action of the lure was greatly diminished by the means employed to make the lures convertible. In my present lure it is believed that I have provided a means for providing a convertible lure which is simple in construction and which permit interchanging the body portion of the lure quite quickly without untying or retying lines and this makes it very convenient for the fisherman to fit his lure to the fishing conditions encountered with about the same ease that a fly fisherman changes his flies on a pool as he is trying to simulate the food being taken by the fish.

A principal object of my invention therefore is to provide a lure having a hook and leader means which can be attached to the fishing line and to then apply to this hook means bodies of a size, color or action best suited to the fishing conditions of the moment.

A further object of the invention is to provide means so that when the lure is assembled for fishing, the body of the lure is free to slide up the line away from the assembly when a fish strikes so that the fish does not have the body of the lure to assist it in breaking loose from the hook.

A further object of this invention is to provide a hook means which enables the fisherman to carry a plurality of lure bodies which are without hooks so that they may be carried with the same ease and often with the same carrying means as used for shot gun shells and the like.

Further objects, advantages and capabilities will be apparent from the description and disclosure in the drawings or may be comprehended or are inherent in the device.

FIGURE 4 is an exploded view partly in section showing the various parts employed in making up a lure after this present invention.

FIGURE 5 is a cross-sectional view taken along the line 5—5 of FIGURE 1.

FIGURE 6 is a front elevation of my lure showing a latching means for one of the movable parts of the lure.

FIGURE 7 is a modified form of lure to which has been further attached a flexible fish body envelope.

Figure 1:
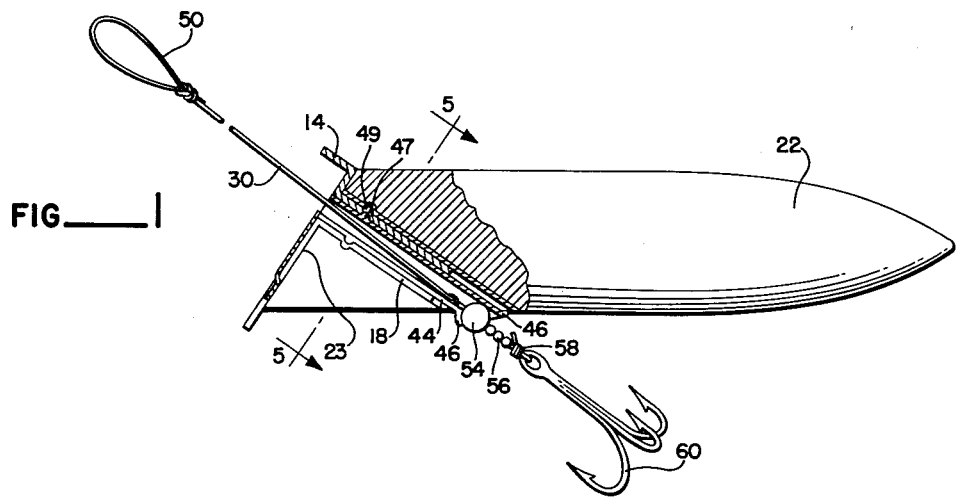
FIGURE 1 is a side elevation of a plug lure made after the teachings of this present invention with certain parts broken away and shown in section.

Referring to the drawings, throughout which like reference numerals indicate like parts, the numeral 10 indicates the guide head which may be of various forms and which provides the water impingement frontal guide plate 12, and in many instances an angularly disposed eddy making surfacing 14. As will be noted particularly in FIGURES 1, 6 and 7 the main water impingement plate 12 may be appreciably larger than the body of the lure and is provided with an integral guide sleeve 18. In order to comply with the basic concept of this invention the guide plate and sleeve are both provided with a slot 16 extending from opening 19 vertically to the lower margin of the plate and throughout the length of the guide sleeve. This arrangement simplifies attaching the guide head to a line without having the end of the line available to pass through opening 19 and the guide sleeve 18 and because of this fact the use of this equipment is greatly facilitated.

Guide sleeve 18 is adapted to fit into a cylindrical bore formed in the body of the lure. This cylindrical recess 20 may follow the forms shown throughout the drawings. In the case of a plug body, as 22, the recess is positioned to start well up on the sloping face 23 of the plug and to then pass out of the body well back from the face at the lower side of the body. Preferably, the longitudinal axis of the base is in the vertical plane passing through the longitudinal axis of the lure body. To improve the fit and wearing properties of the lure this cylindrical recess 20 may preferably have a plastic or metal liner 24. In order to coact with slot 16 of the guide head a slot is formed in the plug body as indicated at 26 and normally if the cavity is lined, a continuation is formed of the lining, as at 28, to prevent deformation of the slot which is provided to facilitate the engagement of the fish hook leader or line 30.

Figure 3:
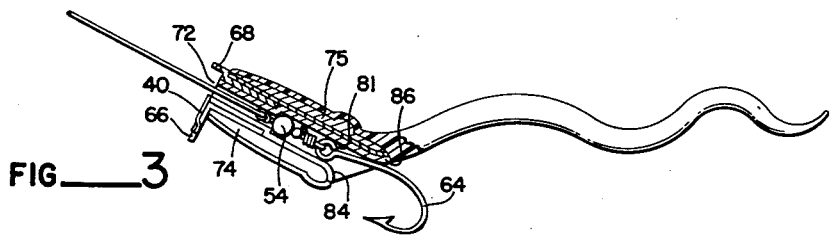
FIGURE 3 is a longitudinal sectional view through the body of the lure and showing the form employed as with earth worms and similar animal or fish life.

To simplify the operation of this equipment and to secure line leader 30 in operational position a lock tube 34 is provided. This tube, in keeping with parts 10 and the plug body 22, is also provided with a longitudinally extending slot 36 which coacts with slots 16 and 26 and when the three slots are aligned the lure body may be engaged or disengaged from line 30. To lock the line within the interior passageway 38 of tube 34 the tube is rotated so that the slots are no longer aligned. It is then desirable to have means to secure the lock tube against turning and releasing the line and a preferred form of this release means is to provide a resilient latch member 40 fixedly secured to tube 34 and having on its innermost face a detent 55, which when the tube is revolved suitably will engage in slot 16 of the guide head and thus secure the lock tube in operational position with line 30 inside the tube. After the metal portions of the lure are assembled they are not subject to disassembly. The latch member 40, in certain types, made of thin metal, may be sprung for insertion through tube 18. In heavier types the guide plate 12, sleeve 18, liner 24 and lock tube 34 are assembled and then latch member 40 is secured to tube 34 by soldering or by cementing in the case of plastic parts. In some of the smaller forms of the invention it is desired to simplify this locking means and to this end a modified tube as 44 may be employed in which an irregularly formed flange 46 is formed to fit into a slight enlargement of the end of chamber 20. This flange is angularly disposed, as is indicated in FIGURES 1, 3 and 4, with respect to the longitudinal axis of tubes 34 or 44 and this provides a satisfactory locking means when the tube 44 is pressed up into its position of use in full engagement with the guide sleeve 18. The security of this arrangement can be improved by having the longitudinally slotted tube 44 sprung outwardly slightly so it must be compressed to enter tube 18 and further detents may be provided as are indicated at 47 and 49 in FIGURE 1. Such detents can easily be seated due to the fact that tube 44 must be slotted as at 36 to provide for the passage of line 30 and is therefore subject to flexing.

Figure 2:
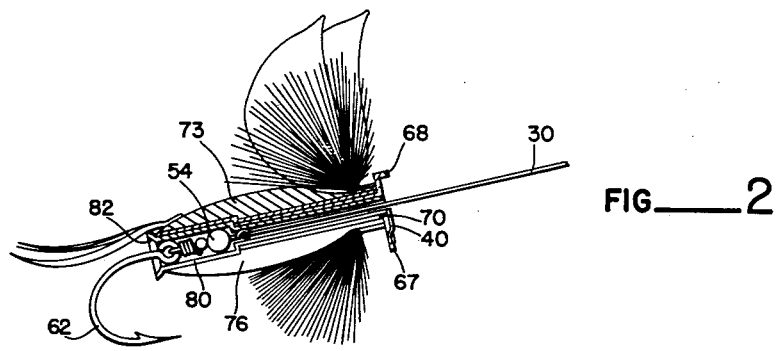
FIGURE 2 is a longitudinal, sectional view of a modified form of a fish lure adapted to use with fishing flies.

Line 30 may be made of various suitable materials. In the smaller size it is normally monofilament leader stock of adequate size or for other certain uses a metal wire or heavier cord may be employed. In one end line 30 is provided with a loop 50 for attachment to the fishing line. At its other end a knot is provided as at 52 to generally position the stop bead 54. Line 30 further passes through bead 54 and through a plurality of spacing beads 56 and finally is fixedly secured as by knot 58 to the fishing hook 60. In the form of body shown in FIGURES 1, 4 and 7, treble hooks are indicated and these normally are preferred for use with the more or less conventional plug bodies as 22. For the adaptations of this principle to other lures as indicated in FIGURES 2 and 3 it quite often is preferable to use only a single hook as shown at 62 and 64. Beads 58 give a degree of rigidity to the line connecting bead 54 and the hook 60 and also space bead 54 so that the hook will be at the optimum position when bead 54 is engaged with tube 34 or 44 and taking the full load of pulling the lure. It is believed understood that bead 54 is in no way fixedly secured to the lure. Consequently, if a fish strikes the dependent hooks it will normally withdraw the hook and bead 54 away from the body of the lure with the lure sliding freely on line 30. In the case of a plug lure this is particularly desirable as it does not give a fish the opportunity of using the lure body as a base upon which to wrest the hook out of its flesh.

FIGURES 2 and 3 illustrate the adaption of this principle to small lures. In this connection it is to be observed that FIGURES 2 and 3 might be considered as full size or the lures might be made only a fraction of the sizes shown. The general parts of these lures have the same functioning as that previously described in that a small face plate for water impingement purposes may be provided at 66 and 67, the turbulent shelf provided at 68 and the guide sleeve proper 70 is provided with a slot throughout its length which will admit line 30 into the inner portion of the lure and facilitate interchangeability of the parts as in the plug illustrated. For different types of lures the guide sleeve may be modified further as indicated at 72 in FIGURE 3. The bodies of the lures 73 and 75 are both provided with downwardly directed slots throughout the length of the body as indicated at 74 and 76. The lock tubes 80 and 81 function as before and are provided with the longitudinally extending slots characterizing the tubes 34 and 44 so that convenient convertible means is provided for the lures. It will be noted that the stop beads 54 and the eyed end of hooks 62 and 64 may be taken up into the enlarged cavities as 82 and 84 of the lock tubes. The locking in this form may depend entirely on frictional engagement in the case of FIGURE 2, or the irregular shape of flange 86 as shown in FIGURE 3, or the detents of the type illustrated more fully in FIGURE 1 may be employed.

Referring to FIGURE 7, a further modification of structure is involved wherein the body is rather deeply notched at 90 so that the end flange 92 of the lock tube may be at right angles to the axis of the lock tube. This figure also illustrates an additive element in that the rear of the plug is encased in a flexible plastic or rubber-like material formed as an envelope and shaped like the tail end of a fish to provide the tail as 94 and various fins as 96.

It is believed that it will be apparent from the above description and the disclosure in the drawings that the invention comprehends a novel construction of a convertible fish lure.

Having thus disclosed the invention, I claim:

1. A convertible fishing lure comprising: a lure body having a cylindrical bore with its longitudinal axis in a vertical plane passing through the longitudinal axis of said lure body; there being a vertical slot formed in said lure body communicating with said cylindrical bore and passing through the bottom surface of said body and extending to the front end of the body; a guide head, adapted to cover the leading end of said lure body and having a guide sleeve disposed within said cylindrical bore; said guide head and said guide sleeve having a line opening in alignment with said bore; said guide head and said guide sleeve having a vertical slot extending downwardly from said sleeve and line opening; a lock tube adapted to frictionally engage said guide sleeve and having a slot cutting through the tube wall for the full length of said lock tube and means for locking said lock tube against rotation within said guide sleeve; a hook line having a fish hook at one end and a loop on its other end, adapted to pass through the slots in said guide head and sleeve, said body and said lock tube without endwise movement in respect to said guide head and sleeve, said body and said lock tube and said lock tube adapted to be revolved a portion of a revolution and close the passageway through said slots but not limit endwise movement of the hook line through said lock tube and guide sleeve.

2. A convertible fishing lure comprising: a plug body of round cross-section having a cylindrical bore with its longitudinal axis in a vertical plane passing through the longitudinal axis of said plug body and forming an acute angle therewith; said bore passing out through the bottom surface of said plug body forward of the longitudinal center of said body; there being a vertical slot formed in said lure body communicating with said cylindrical bore and passing through the bottom surface at the front end of said plug body; a guide head, adapted to cover the leading end of said lure body and having a tubular guide sleeve disposed within said cylindrical bore; said guide head having a line opening therethrough of substantially the same size and in alignment with the interior of said tubular guide sleeve; said guide head and said guide sleeve having an open vertical slot extending downwardly from said sleeve and line opening and extending to the leading end of said lure; a lock tube adapted to fit inside of said guide sleeve and having a slot cutting through the tube wall for the full length of said lock tube and means for locking said lock tube against rotation within said guide sleeve; a hook line having a fish hook at one end and a loop on its other end, adapted to pass through the slots in said guide head and sleeve, said body and said lock tube without endwise movement in respect to said guide head and sleeve, said body and said lock tube and said lock tube adapted to be revolved a portion of a revolution and close the passageway through said slots, but not limit endwise movement of the hook line through said lock tube and guide sleeve.

3. The subject matter of claim 2 in which said guide head is rectangular in form and has a forwardly extending eddy-making surface secured adjacent to its upper margin and substantially at right angles to the plane of said guide head.

4. The subject matter of claim 2 in which said lock tube has secured to the leading end thereof a resilient latch member having a rearwardly extending detent on its innermost face which when the lock tube is rotated sufficiently to lock the line in said tube, the detent will engage in the vertical slot in said guide head and lock the lock tube against further rotation.

References Cited in the file of this patent

UNITED STATES PATENTS

| | | |
|---|---|---|
| 2,662,328 | Oyler | Dec. 15, 1953 |
| 2,734,301 | Fuqua | Feb. 14, 1956 |

FOREIGN PATENTS

| | | |
|---|---|---|
| 935,819 | France | Feb. 9, 1948 |